(12) United States Patent
Chen et al.

(10) Patent No.: US 7,607,782 B2
(45) Date of Patent: Oct. 27, 2009

(54) PROJECTION APPARATUS PROVIDED WITH A COOLING SYSTEM

(75) Inventors: Ying-Chieh Chen, Miao Li County (TW); Tsung-Ching Lin, Miao Li County (TW); Nien-Hui Hsu, Miao Li County (TW)

(73) Assignee: Coretronic Corporation, Chu-Nan, Miao Li County (TW)

( * ) Notice: Subject to any disclaimer, the term of this patent is extended or adjusted under 35 U.S.C. 154(b) by 489 days.

(21) Appl. No.: 11/431,564

(22) Filed: May 11, 2006

(65) Prior Publication Data

US 2006/0256297 A1 Nov. 16, 2006

(30) Foreign Application Priority Data

May 13, 2005 (TW) ............................... 94115594 A

(51) Int. Cl.
*F21V 29/00* (2006.01)
*G03B 21/16* (2006.01)
(52) U.S. Cl. ......................................... 353/61; 362/294
(58) Field of Classification Search ................... 353/57, 353/58, 59, 60, 61, 119, 122, 85; 362/345, 362/373, 294; 348/748; 352/202
See application file for complete search history.

(56) References Cited

U.S. PATENT DOCUMENTS

| 6,758,583 | B2 * | 7/2004 | Hsu et al. | 362/373 |
| 7,210,825 | B2 * | 5/2007 | Watanabe et al. | 362/373 |
| 2003/0179579 | A1 * | 9/2003 | Hsu et al. | 362/294 |
| 2004/0263799 | A1 * | 12/2004 | Lim | 353/61 |
| 2005/0036115 | A1 * | 2/2005 | Kim et al. | 353/61 |
| 2005/0225963 | A1 * | 10/2005 | Huang et al. | 362/96 |
| 2007/0146645 | A1 * | 6/2007 | Lin et al. | 353/58 |

* cited by examiner

*Primary Examiner*—William C Dowling
*Assistant Examiner*—Ryan Howard
(74) *Attorney, Agent, or Firm*—Birch, Stewart, Kolasch & Birch, LLP

(57) ABSTRACT

A cooling system is for cooling a lamp module within a projection apparatus and includes an axial fan unit for mounting within the projection apparatus, defining an axial direction and having an air discharging side to permit an airflow flow therethrough, the airflow defining a flow direction that cooperates with the axial direction to define an angle therebetween. The system further includes a flow-guiding duct that has an air inlet located adjacent to the discharging side of the axial fan unit and that is oriented toward the angle in such a manner to define the flow direction for guiding the airflow toward the lamp module.

18 Claims, 4 Drawing Sheets

PROJECTION APPARATUS PROVIDED WITH A COOLING SYSTEM

FIELD OF THE INVENTION

The invention relates to a cooling system, and more particularly to a cooling system for use in a projection apparatus in order to cool a lamp module within the projection apparatus by means of airflow.

BACKGROUND OF THE INVENTION

FIG. 1 is a top sectional view illustrating an interior of a conventional projection apparatus 2, and includes a projection lens 3, and a lamp module 4 for generating light rays required by the projection lens 3 in order to project an image onto a screen.

The lamp module 4 usually generates intensive heat in the conventional projection apparatus 2 during operation thereof. In case, intensive heat is not effectively dissipated or lowered, components within the conventional projection apparatus 2 tends to damage or malfunction. Traditionally, the lamp module 4 is mounted within a lamp receptacle body 12 and is cooled by a centrifugal fan unit 8 and an axial fan unit 10.

The lamp module 4 generally includes a burner 410 for generating the light rays and a reflector 411 covering the burner 410 for reflecting the light rays toward the projection lens 3. The conventional design for cooling the lamp module 4 uses the centrifugal fan unit 8 to cause airflow toward the burner 410 and the axial fan unit 10 to cause airflow toward the reflector 411.

As shown in FIG. 1, the airflow caused by the centrifugal fan unit 8 is guided toward an air apertures 1202 formed in the lamp receptacle body 12 in order to cool an interior of the lamp module 4. The axial fan unit 10 is mounted on the lamp receptacle body 12 at one side of the lamp module 4, and causes another airflow for directly cooling an exterior of the lamp module 4, the intensive heat generated by the burner 410 and the reflector 411 can be lowered or maintained.

The employment of the two fan units 8, 10 occupy a relatively large amount of space within the conventional projection apparatus 2 and results in extra expense for the manufacturer. Since the object of the manufacturers is in the trend to produce the conventional projection apparatus in the compact size, the design to employ more than one fan unit hinders the targeted object.

Therefore, the object of the present invention is to provide a cooling system for use in a projection apparatus. The cooling system requires a lesser fan unit in order to cool the lamp module within the projection apparatus.

SUMMARY OF THE INVENTION

It is an object of the present invention to provide a cooling system that utilizes a lesser fan unit but achieves an effective cooling ability for cooling a lamp module in a projection apparatus, thereby economizing manufacturing cost and producing an apparatus in compact size due to reduction of space occupied by the fan unit.

In one aspect of the present invention, the cooling system is provided for cooling the lamp module within the projection apparatus, the cooling system includes an axial fan unit for mounting within the projection apparatus, defining an axial direction and having an air discharging side to permit an airflow flow therethrough upon actuation of the axial fan unit, the airflow defining a flow direction that cooperates with the axial direction to define an angle θ therebetween; and a flow-guiding duct having an air inlet located adjacent to the air discharging side of the axial fan unit and disposed in such a manner to define the flow direction for guiding the airflow toward the lamp module in order to cool the lamp module.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENT

Figure 1:
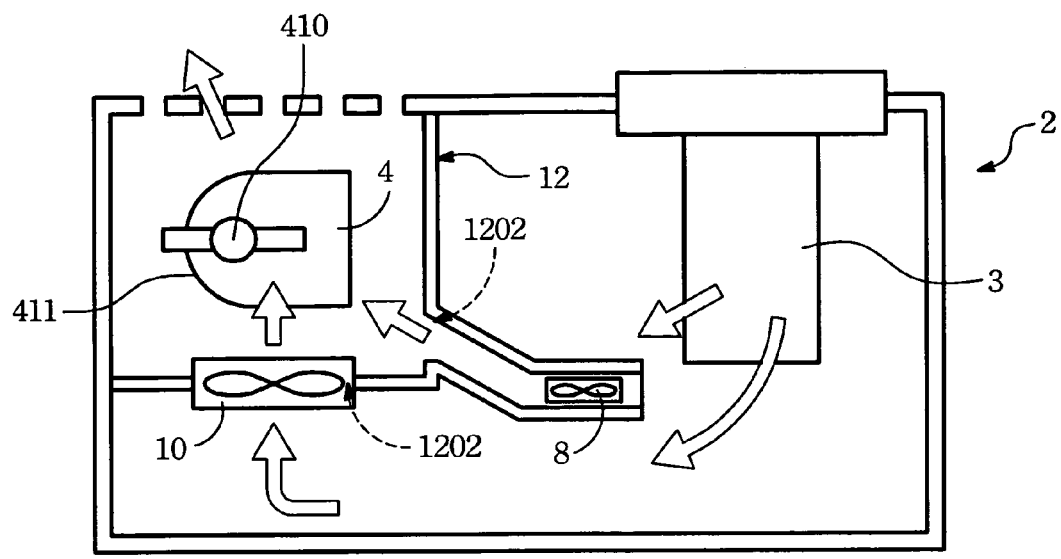
FIG. 1 is a top sectional view illustrating an interior of a conventional projection apparatus.
Figure 2:
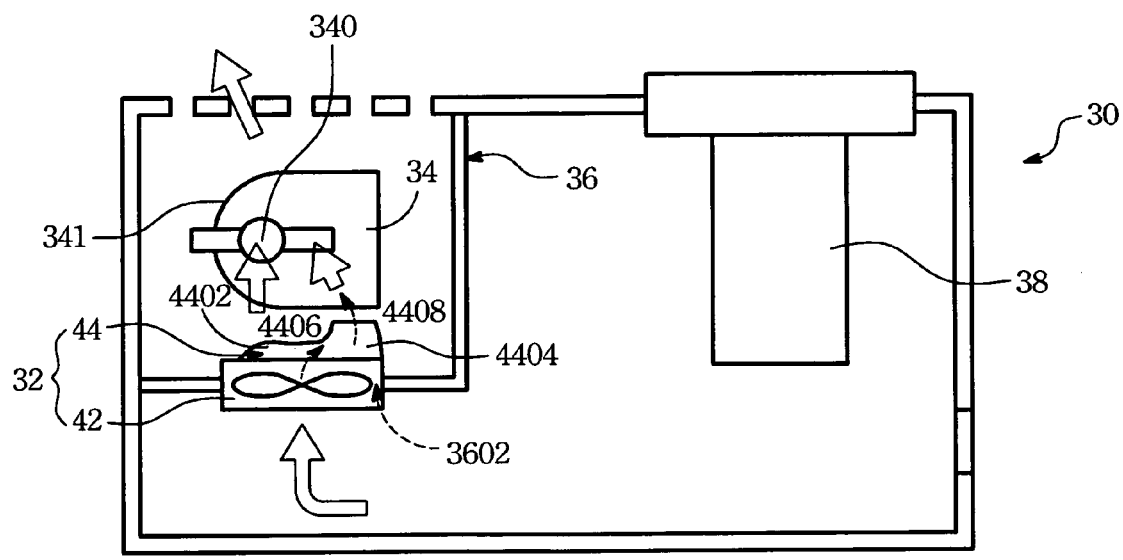
FIG. 2 is a top sectional view illustrating an interior of a projection apparatus of the present invention.

FIG. 2 is a top sectional view illustrating an interior of the projection apparatus 30 of the present invention. The projection apparatus 30 includes a cooling system 32, a lamp receptacle body 36, a lamp module 34 and a projection lens 38. The receptacle body 36 is disposed at one side of the projection lens 38.

The cooling system 32 includes an axial fan unit 42 and a flow-guiding duct 44. The lamp module 34 is mounted within the lamp receptacle body 36 for generating light rays required by the projection lens 38 in order to project an image onto a screen (not shown). The lamp module 34 generally includes a burner 340 for generating the light rays, and a reflector 341 covering the burner 340 for reflecting the light rays toward the projection lens 38. The axial fan unit 42 is mounted within a mounting hole 3602 of the lamp receptacle body 36 so as to be disposed at one side of the lamp module 34. The flow-guiding duct 44 is mounted on the lamp receptacle body 36 in such a manner to be located between the lamp module 34 and the axial fan unit 42.

Figure 4:
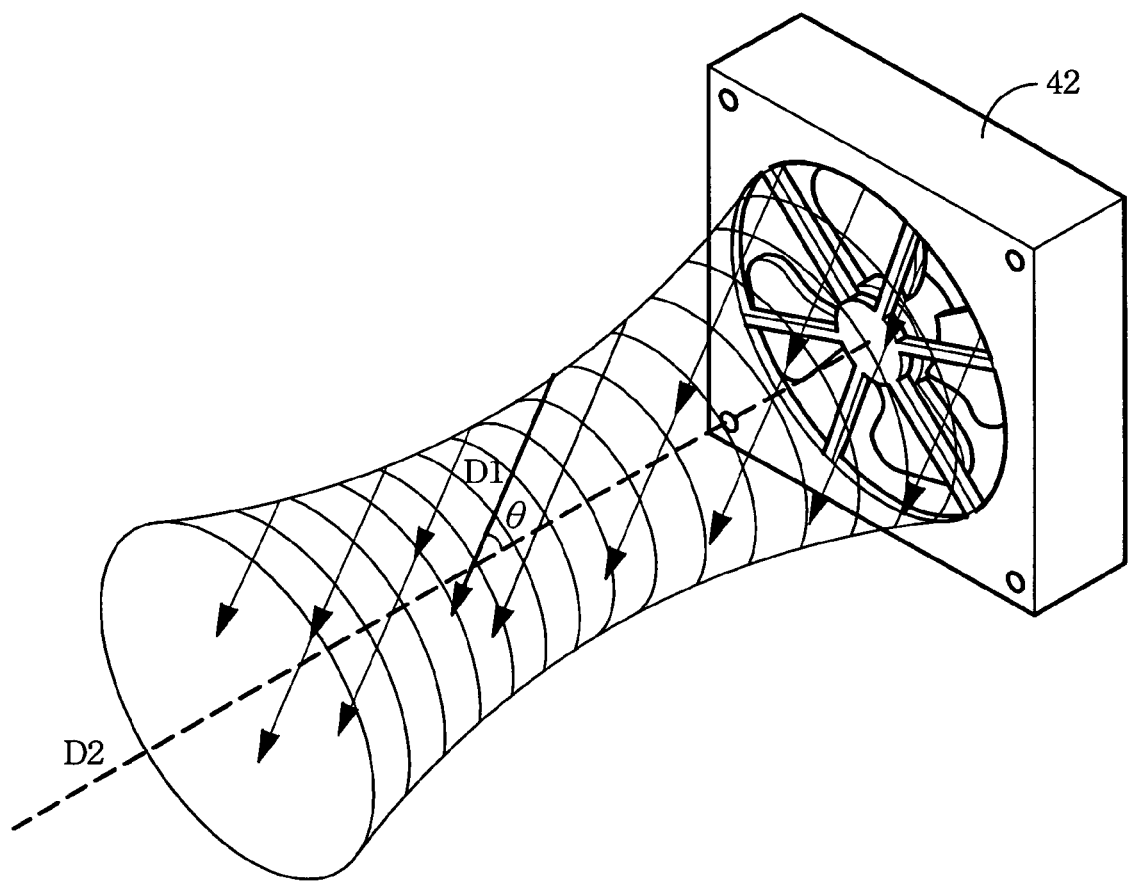
FIG. 4 illustrates an airflow direction in the cooling system employed in the projection apparatus of the present invention.

Since the axial fan unit 42 is mounted within the projection apparatus 30, and causes upon actuation thereof an airflow that draws the atmospheric air from an exterior of the lamp receptacle body 36 into an interior of the lamp receptacle body 36 so as to cool the lamp module 34. Referring to FIG. 4, the axial fan unit 42 defines an axial direction D2. The flow-guiding duct 44 is disposed adjacent to the axial fan unit 42 in such a manner to define a flow direction D1 for guiding the airflow toward the lamp module 34 in order to cool the lamp module 34. Note that the flow direction D1 cooperates with the axial direction D2 to define an angle θ therebetween.

Figure 3:
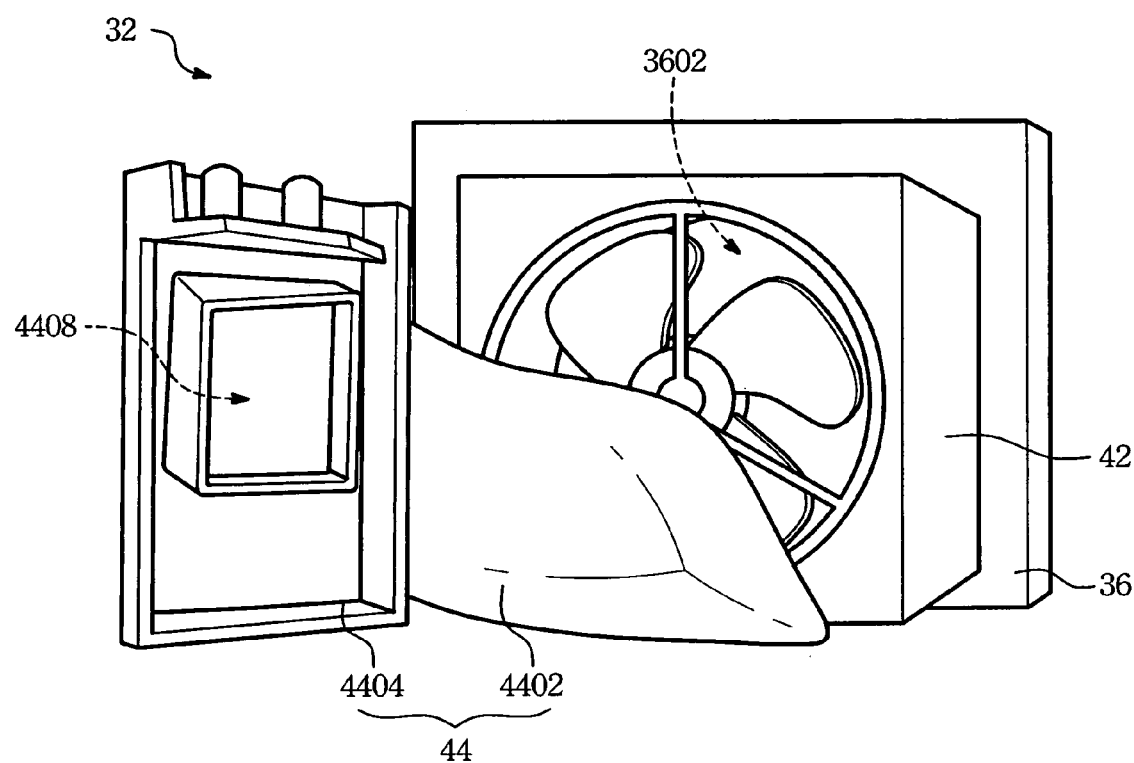
FIG. 3 is a fragmentary view illustrating a cooling system employed in the projection apparatus of the present invention.

Referring again to FIGS. 2 and 3, the flow-guiding duct 44 has an air inlet 4406 located adjacent to the axial fan unit 42 in such a manner to define the flow direction D1. The flow-guiding duct 44 is oriented toward the angle θ such that the air generated from the fan unit 42 is guided directly toward the lamp module 34 so as to effectively dissipate heat generated by the burner 340 and the reflector 341.

The axial fan unit 42 has an air discharging side and an air introduction side opposite to the air discharging side for introducing an air from an exterior of the lamp receptacle body 36 toward the air discharging side. The air inlet 4406 of the flow-guiding duct 44 covers partially the air discharging side of the axial fan unit 42. Preferably, the air inlet 4406 of the flow-guiding duct 44 has a dimension in cross-section ranging 10% to 50% surface area of the air discharging side of the axial fan unit 42. In this embodiment, the air inlet 4406 of the flow-guiding duct 44 covers only one third of the entire surface area of the air discharging side of the axial fan unit 42.

The flow-guiding duct 44 further has an air outlet 4408 that is opposite to the air inlet 4406 and that is disposed adjacent to the lamp module 34. The flow-guiding duct 44 further includes a collecting duct portion 4402 and a guiding duct portion 4404.

The collecting duct portion 4402 has one distal end defining the air inlet 4406 so as to collect air from said axial fan unit 42 into said flow direction D1. The guiding duct portion 4404 extends integrally from the collecting duct portion 4402 and has a distal end defining the air outlet 4408 for cooling the lamp module 34.

Due to an arranged design between the axial fan unit 42 and the flow-guiding duct 44, the air inlet 4406 of the collecting duct portion 4402 covers partially the air discharging side of the axial fan unit 42 so that a portion of the air discharged from the air discharging side of the axial fan unit 42 is guided directly toward the burner 340 while remaining portion thereof is guided toward the exterior of the reflector 341 via the guiding duct portion 4404. Moreover, the axial fan unit 42 is, capable of causing an air circulation to expel the air with heat from an interior of the projection apparatus 30 to an exterior of the projection apparatus 30.

Figure 5:
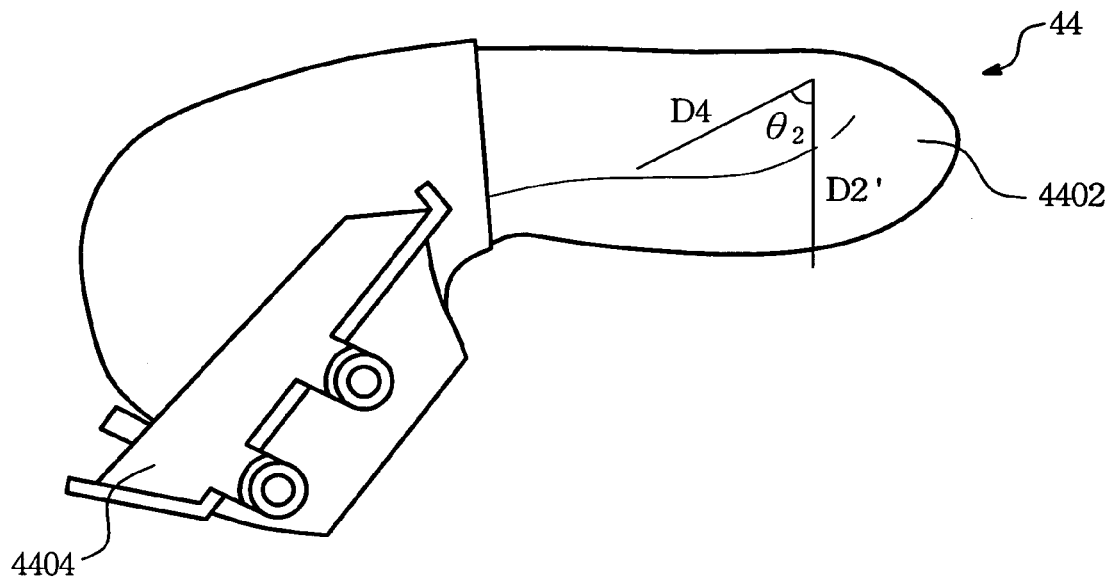
FIG. 5 is a top view of the cooling system employed in the projection apparatus of the present invention.

The aforesaid angle θ can be divided as follows. FIG. 5 is a top view of the cooling system 32, wherein the collecting duct portion 4402 of the flow-guiding duct 44 extends in a D4 direction in a horizontal plane and the D4 direction cooperates with the axial direction D2 projected onto the horizontal plane, D2', to define a first acute angle $\theta_2$ therebetween. The first acute angle $\theta_2$ ranges from 60° to 90°.

Figure 6:
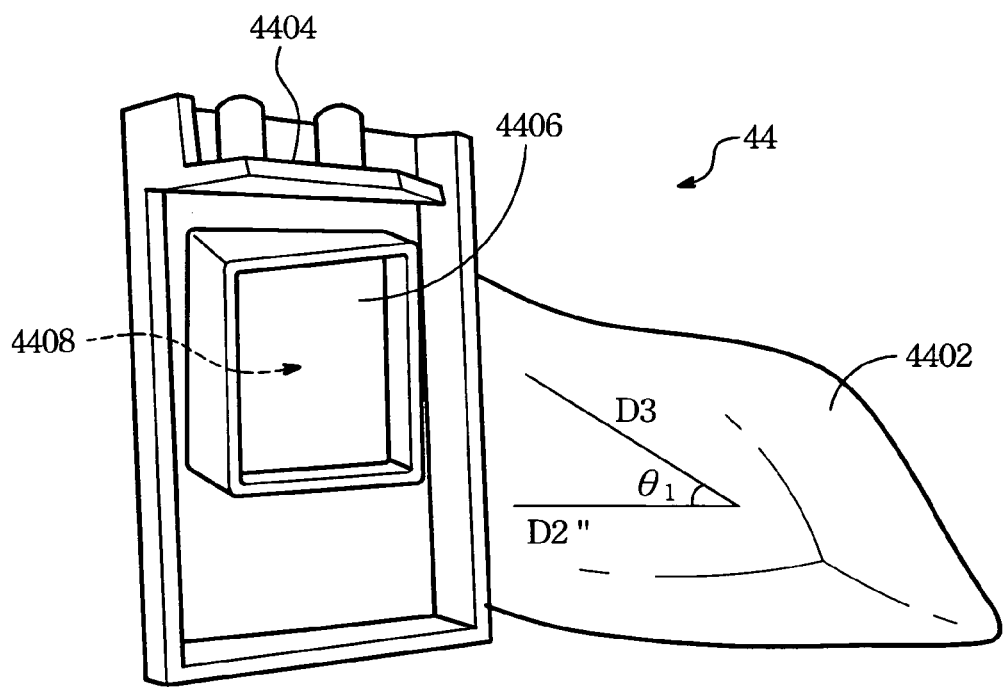
FIG. 6 is a front view of the cooling system employed in the projection apparatus of the present invention.

FIG. 6 shows a front view of the cooling system 32, wherein the collecting duct portion 4402 of the flow-guiding duct 44 extends in D3 direction in a vertical plane perpendicular to the horizontal plane and the D3 direction cooperates with the axial direction D2 projected onto the vertical plane, D2", to define a second acute angle θ 1 therebetween. In this embodiment, the second acute angle $\theta_1$ ranges from 30° to 60°.

When the first and second acute angles $\theta_2$ and $\theta_1$ of the collecting duct portion 4402 of the flow-guiding duct 44 is thus arranged, the airflow caused by the axial fan unit 42 can effectively cool down the heat generated by the lamp module 34 during operation of the projection apparatus 30 of the present invention.

To summarize the above paragraphs, it is observable that only a single fan unit is employed in the cooling system 32 of the projection apparatus 30 of the present invention. The fan unit can effectively cool the heat generated by the lamp module 34, which in turn economizes the manufacturing cost and subsequently minimizes the storage space within the projection apparatus 30.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A cooling system for cooling a lamp module within a projection apparatus, the cooling system comprising:

an axial fan unit for mounting within the projection apparatus, defining an axial direction and having an air discharging side to permit an airflow flow therethrough upon actuation of said axial fan unit, said airflow defining a flow direction that cooperates with said axial direction to define an angle therebetween; and a flow-guiding duct having an air inlet located adjacent to said air discharging side of said axial fan unit, said flow-guiding duct being oriented toward said angle in such a manner to form said flow direction for guiding said airflow toward the lamp module in order to cool the lamp module, wherein said flow-guiding duct further has an air outlet that is opposite to said air inlet and adapted to be located adjacent to the lamp module, said flow-guiding duct further including a collecting duct portion having a distal end defining said air inlet so as to collect air from said axial fan unit into said flow direction, and a guiding duct portion extending integrally from said collecting duct portion and having a distal end defining said air outlet for cooling the lamp module, and wherein said collecting duct portion of said flow-guiding duct extends in a first direction in a horizontal plane and further cooperates with said axial direction projected onto the horizontal plane to define a first acute angle therebetween, said collecting duct portion of said flow-guiding duct extending in a second direction in a vertical plane perpendicular to the horizontal plane and further cooperating with said axial direction projected onto the vertical plane to define a second acute angle therebetween.

2. The cooling system according to claim 1, wherein the lamp module includes a burner, said air outlet of said flow-guiding duct being directed toward the burner of the lamp module.

3. The cooling system according to claim 1, wherein said first acute angle ranges from 60° to 90° while said second acute angle ranges from 30° to 60°.

4. The cooling system according to claim 1, wherein said axial fan unit is adapted to be disposed at one side of the lamp module.

5. The cooling system according to claim 1, wherein the projection apparatus further includes a lamp receptacle body receiving the lamp module therein, the lamp receptacle body being formed with a mounting hole, said axial fan unit being adapted to be mounted securely within the mounting hole in the lamp receptacle body.

6. The cooling system according to claim 1, wherein said air inlet of said flow-guiding duct covers partially said air discharging side of said axial fan unit.

7. The cooling system according to claim 6, wherein said air inlet of said flow-guiding duct has a dimension in cross-section ranging 10% to 50% surface area of said air discharging side of said axial fan unit.

8. The cooling system according to claim 1, wherein said axial fan unit further has an air introduction side opposite to said air discharging side for introducing an external air toward said air discharging side.

9. The cooling system according to claim 1, wherein a portion of air discharged from said air discharging side of said axial fan unit is guided toward a burner of the lamp module and remaining portion thereof is guided toward a reflector of the lamp module via said flow-guiding duct.

10. A cooling system for cooling a lamp module within a projection apparatus, the cooling system comprising:

an axial fan unit for mounting within the projection apparatus, defining an axial direction and having an air discharging side to permit an airflow flow therethrough upon actuation of said axial fan unit, said airflow defining a flow direction that cooperates with said axial direction to define an angle therebetween; and a flow-guiding duct having an air inlet located adjacent to said air discharging side of said axial fan unit, said flow-guiding duct being oriented toward said angle in such a manner to form said flow direction for guiding said airflow toward the lamp module in order to cool the lamp module, wherein said flow-guiding duct includes a collecting duct portion and a guiding duct portion extending integrally from said collecting duct portion, said collecting duct portion extending in a first direction in a horizontal plane and further cooperating with said axial direction projected onto the horizontal plane to define a first acute angle therebetween, said collecting duct portion extending in a second direction in a vertical plane perpendicular to the horizontal plane and further cooperating with said axial direction projected onto the vertical plane to define a second acute angle therebetween.

11. The cooling system according to claim 10, wherein said flow-guiding duct further has an air outlet that is opposite to said air inlet and adapted to be located adjacent to the lamp module, and said collecting duct portion having a distal end defining said air inlet so as to collect air from said axial fan unit into said flow direction, and said guiding duct portion having a distal end defining said air outlet for cooling the lamp module.

12. The cooling system according to claim 11, wherein the lamp module includes a burner, said air outlet of said flow-guiding duct being directed toward the burner of the lamp module.

13. The cooling system according to claim 10, wherein said first acute angle ranges from 60° to 90° while said second acute angle ranges from 30° to 60°.

14. The cooling system according to claim 10, wherein said axial fan unit is adapted to be disposed at one side of the lamp module.

15. The cooling system according to claim 10, wherein the projection apparatus further includes a lamp receptacle body receiving the lamp module therein, the lamp receptacle body being formed with a mounting hole, said axial fan unit being adapted to be mounted securely within the mounting hole in the lamp receptacle body.

16. The cooling system according to claim 10, wherein said air inlet of said flow-guiding duct covers partially said air discharging side of said axial fan unit.

17. The cooling system according to claim 10, wherein said air inlet of said flow-guiding duct has a dimension in cross-section ranging 10% to 50% surface area of said air discharging side of said axial fan unit.

18. The cooling system according to claim 10, wherein said axial fan unit further has an air introduction side opposite to said air discharging side for introducing an external air toward said air discharging side.

* * * * *